United States Patent
Tanna et al.

(10) Patent No.: US 9,167,287 B2
(45) Date of Patent: Oct. 20, 2015

(54) CONTROLLING A VIEWING SESSION FOR A VIDEO PROGRAM

(75) Inventors: Gaurav Tanna, Brighton, MA (US); Jack Jianxiu Hao, Lexington, MA (US); Diego S. Rozensztejn, Brighton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 448 days.

(21) Appl. No.: 13/314,245

(22) Filed: Dec. 8, 2011

(65) Prior Publication Data

US 2013/0152128 A1    Jun. 13, 2013

(51) Int. Cl.
| | |
|---|---|
| *H04N 7/173* | (2011.01) |
| *H04N 21/41* | (2011.01) |
| *H04N 21/422* | (2011.01) |
| *H04N 21/4722* | (2011.01) |
| *H04N 5/445* | (2011.01) |

(52) U.S. Cl.
CPC ..... *H04N 21/4126* (2013.01); *H04N 21/42204* (2013.01); *H04N 21/4722* (2013.01); *H04N 21/42224* (2013.01)

(58) Field of Classification Search
USPC .............................................. 725/61, 45, 46
See application file for complete search history.

(56) References Cited

U.S. PATENT DOCUMENTS

| | | | | |
|---|---|---|---|---|
| 6,005,565 | A | * | 12/1999 | Legall et al. ................... 715/721 |
| 6,130,726 | A | * | 10/2000 | Darbee et al. ................. 348/734 |
| 6,718,551 | B1 | * | 4/2004 | Swix et al. ....................... 725/32 |
| 7,281,261 | B2 | * | 10/2007 | Jaff et al. ....................... 725/132 |
| 8,006,263 | B2 | * | 8/2011 | Ellis et al. ........................ 725/38 |
| 2005/0034162 | A1 | * | 2/2005 | White et al. ..................... 725/86 |
| 2008/0077965 | A1 | * | 3/2008 | Kamimaki et al. ........... 725/105 |
| 2009/0298535 | A1 | | 12/2009 | Klein et al. |
| 2010/0188575 | A1 | * | 7/2010 | Salomons et al. ............ 348/553 |
| 2011/0041153 | A1 | | 2/2011 | Simon et al. |
| 2013/0061268 | A1 | * | 3/2013 | Rothschild ....................... 725/51 |
| 2013/0081090 | A1 | * | 3/2013 | Lin et al. .......................... 725/62 |

* cited by examiner

*Primary Examiner* — Pankaj Kumar
*Assistant Examiner* — Reuben M Brown

(57) ABSTRACT

A method includes requesting, by a user device, video program related content. The video program related content includes content related to one or more video programs provided by a service provider. The method also includes receiving the video program related content. A selection of a video program from the one or more video programs is received. The video program is selected at a set top box. The method also includes controlling a viewing session for the video program using the user device.

20 Claims, 10 Drawing Sheets

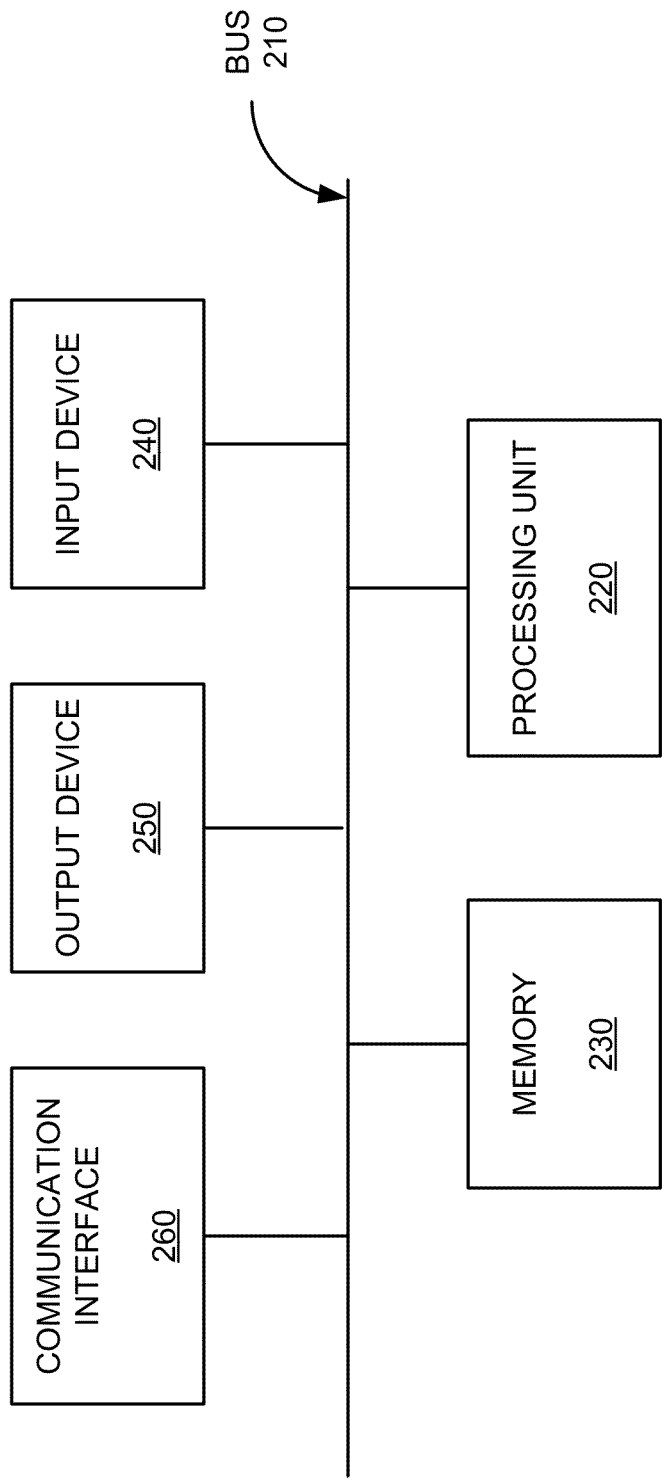

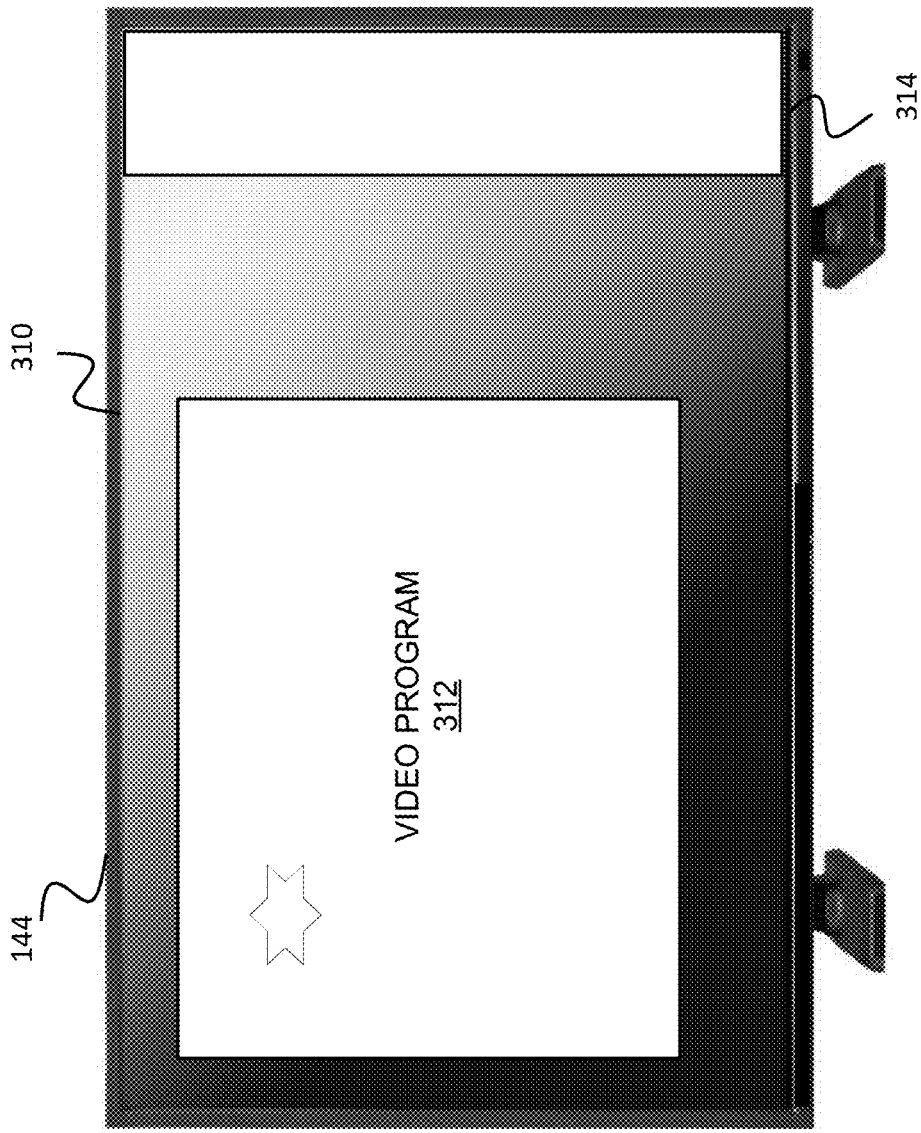
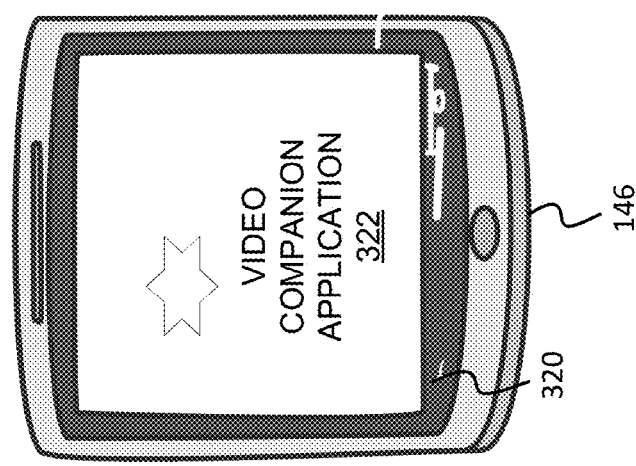
FIG. 3A

| TV CHANNEL | 5:00 – 5:30 PM | 5:30 – 6:00 PM | 6:00 – 6:30 PM | 6:30 – 7:00 PM | 6:30 – 7:00 PM |
|---|---|---|---|---|---|
| XYZ TV | SOME JUDGE | SOME JUDGE | CAR SHOP | CAR SHOP | CAR SHOP |
| LMN TV | STUFF | LMN NEWS | LMN NEWS | PAPA RATS | PAPA RATS |
| WOLF TV | WOLF NEWS | WOLF NEWS | CAUSE WE CAN | CAUSE WE CAN | CAUSE WE CAN |
| APP TV | BLUE WATERS | GREEN HILLS | BLUE WATERS | GREEN HILLS | GREEN HILLS |
| GHI TV | OLD JUDGE | HOME SCHOOL | CRITERIA | CRITERIA | CRITERIA |
| KLM TV | WISECRACK | KLM NEWS | PARTING GIFT | PARTING GIFT | PARTING GIFT |
| GAC TV | HAPPY JOY | BON MOTS | BON MOTS | MERCY PERCY | MERCY PERCY |
| DEF TV | DEF NEWS | DEF NEWS | THE MINISTER | THE MINISTER | THE MINISTER |
| DVR 362 | VOD 364 | TV LISTINGS 366 | RECOMMEND 368 | PORTALS 370 | SETTINGS 370 |

FIG. 3B

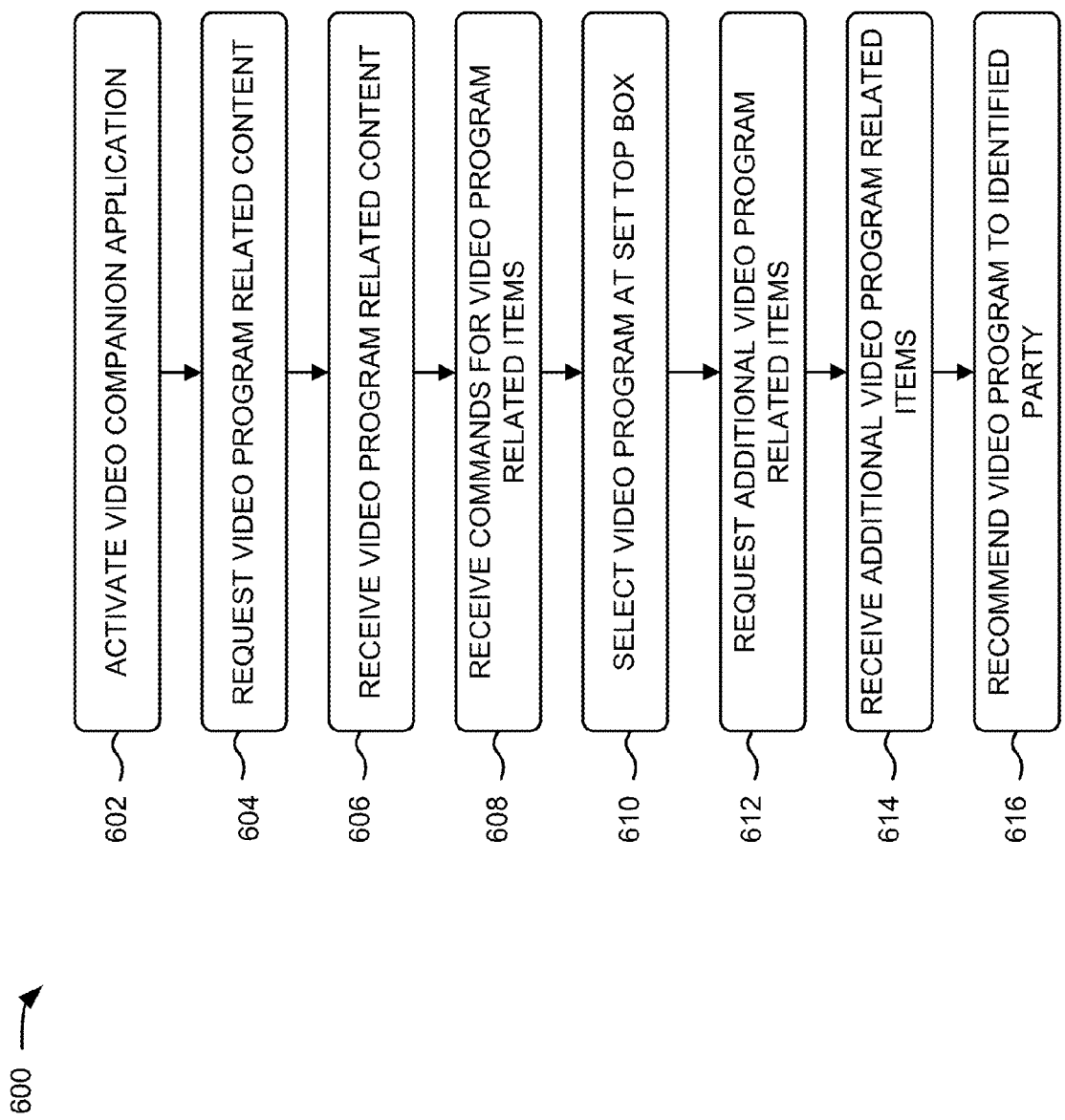

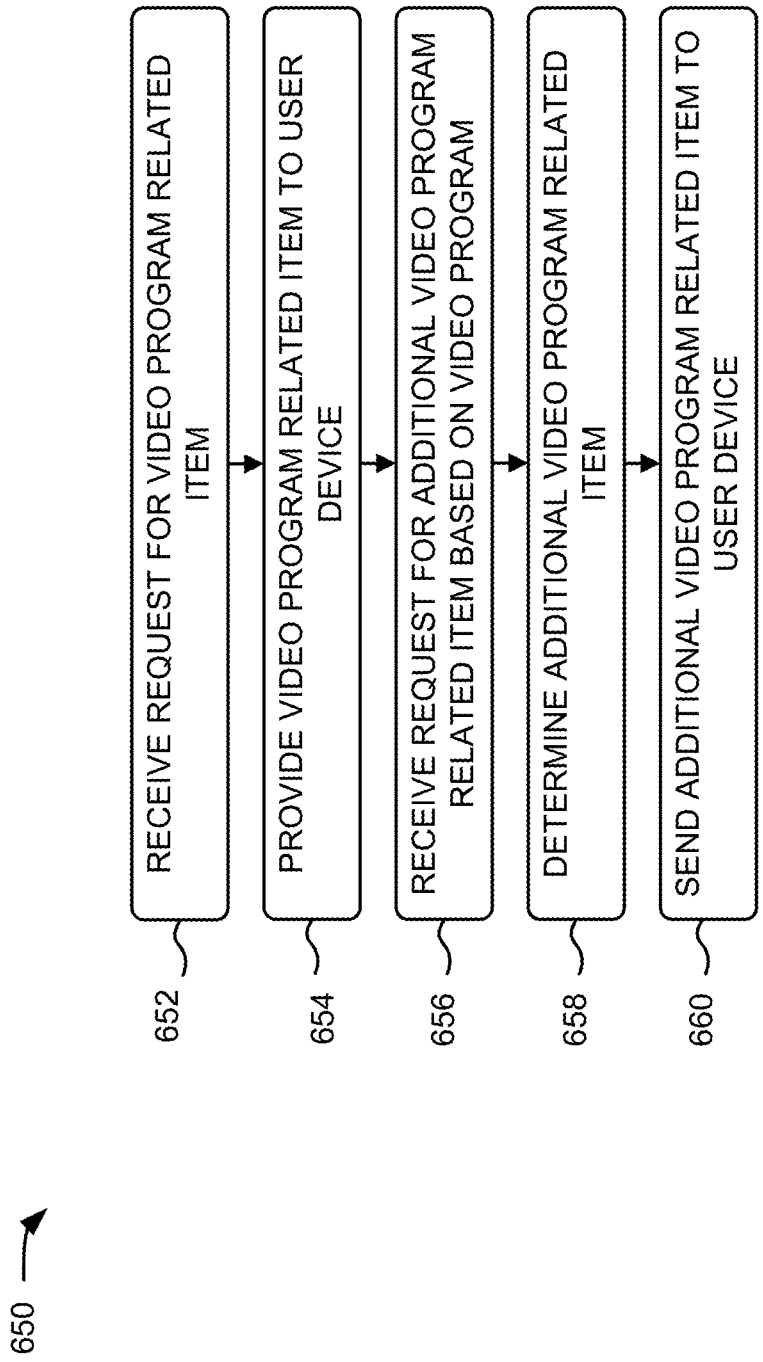

CONTROLLING A VIEWING SESSION FOR A VIDEO PROGRAM

BACKGROUND

Video service providers currently provide multiple services and programs, including cable television, network television, and video on demand, to their customers. In some instances, individual customers may receive combinations of these multiple services from a single video service provider. The video service providers manage relationships with their customers using customer accounts that correspond to the multiple services.

BRIEF DESCRIPTION OF THE DRAWINGS

FIG. 2 illustrates an exemplary configuration of one or more of the components of FIG. 1;

FIG. 3A is a diagram of a user perspective of an exemplary video companion system;

FIG. 3B is a diagram of an exemplary video program guide;

FIG. 6A is a flowchart of an exemplary process for implementing a video companion application;

FIG. 6B is a flowchart of another exemplary process for implementing a video companion application;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments described herein relate to devices, methods, and systems for implementing a video companion application for a video program. The video companion application may be implemented on a first device and the video program may be viewed on a display of a second device. The system and/or methods described herein may provide a user with a framework to control a viewing session for the video program and to use video program related items, such as video program related content and video program related applications, in an integrated context. In an exemplary implementation, systems and/or methods described herein may control a video session for a plurality of devices, which may be dispersed within a network.

As used herein, the terms "user," "consumer," "subscriber," and/or "customer" may be used interchangeably. Also, the terms "user," "consumer," "subscriber," and/or "customer" intended to be broadly interpreted to include a user device or a user of a user device.

Figure 1:
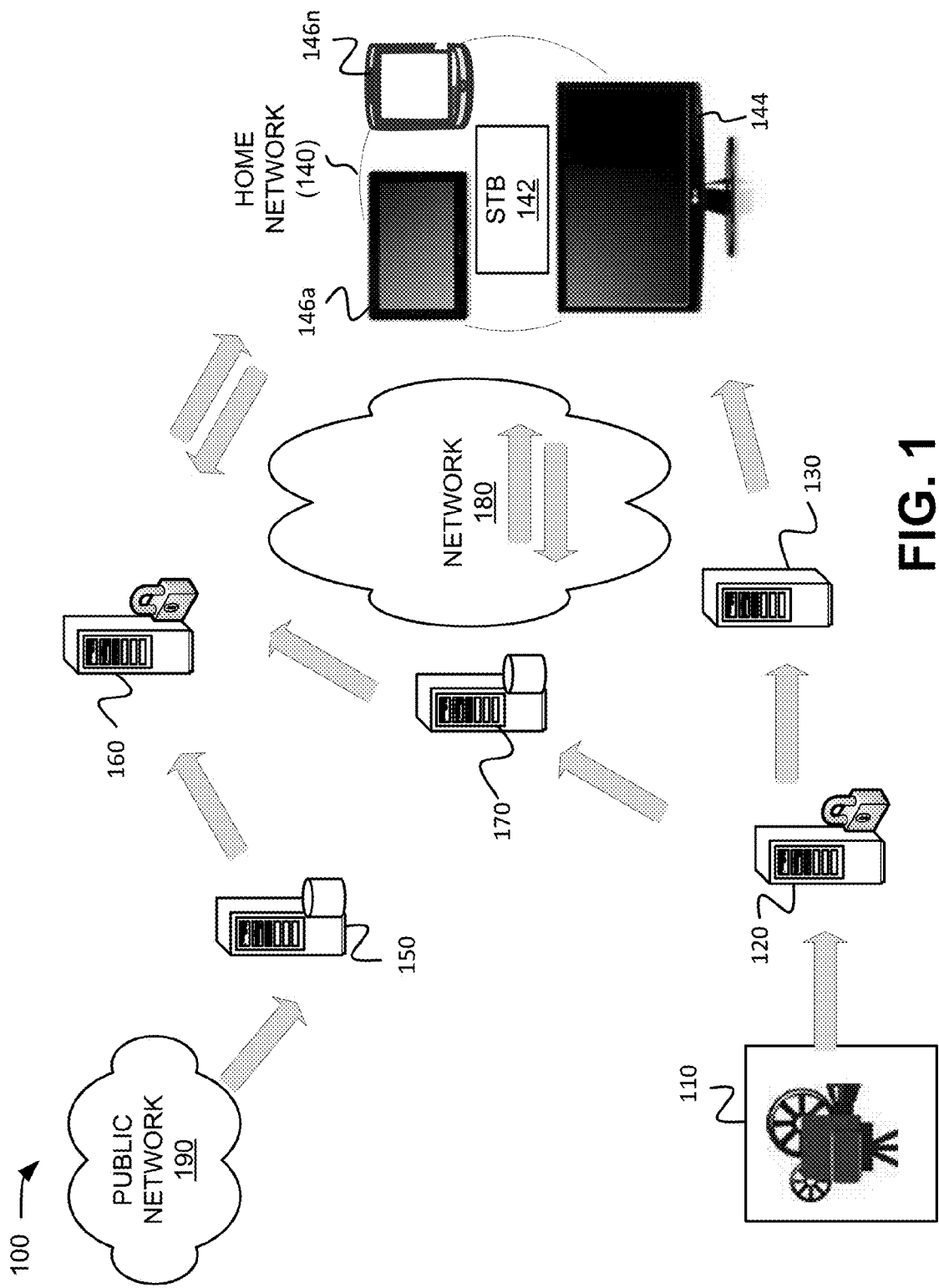
FIG. 1 illustrates an exemplary network in which systems and methods described herein may be implemented.

FIG. 1 is a diagram that illustrates an exemplary environment 100 in which systems and/or methods described herein may be implemented. As shown in FIG. 1, environment 100 may include a content provider 110, a content processing system 120, a content delivery system 130, a home network 140, a content aggregator 150, an application server 160, a license server 170, an access network 180, and a public network 190. Devices and/or networks of FIG. 1 may be connected via wired and/or wireless connections.

Content provider 110 may include one or more providers of video content. For example, content provider 110 may include a television network, a cable television station, a film distributor, etc. Content provider 110 may provide video content to content storage system 120 in a variety of formats, such as a baseband video signal, moving pictures expert group (MPEG) video, etc.

Content storage system 120 may include one or more server devices, such as a computer device, or a storage device, such as a database, that stores and processes video content. Video content may include, for example, personal video content, public video content, and/or other multimedia content. Content storage system 120 may perform encoding operations on video content using, for example, public/private keys. Content storage system 120 may also perform transcoding operations on the video content. Content storage system 120 may store video content in encrypted and/or encoded form. Video content may include, for example, encoded video content in any of a variety of formats, including, for example, Multiview Video Coding (MVC), MPEG-2 TS, MPEG-4 advanced video coding (AVC)/H.264.

Content delivery system 130 may provide video content, instructions, and/or other information to home network 140 and associated devices, such as set top box (STB) 142 and user devices 146a-146n (collectively referred to as user devices 146 and individually as user device 146). Content delivery system 130 may temporarily store and provide content that is the subject of a content request from user device 146. In one implementation, access to content delivery system 130 (e.g., by STB 142 and/or user device 146) may be restricted by a service provider that operates content delivery system 130. For example, access to content delivery system 130 may be restricted to particular users with particular subscription packages and enforced by, for example, password protection (for a user), device identifiers (for user devices 146a-146n, STB 142 and/or home network 140), and/or application identifiers (e.g., residing on user devices 146a-146n, STB 142 and/or portable media). Content delivery system 130 may include implementation devices (not shown), such as a content server, a policy management server, a streaming device, and a content cache.

Content delivery system 130 may manage delivery of video content to user devices 146. For example, content delivery system 130 may permit a user device 146 to download particular video content once the user, of user device 146, has been properly authenticated. In one implementation, the downloading of video content may occur using the file transfer protocol. In another implementation, the downloading of video content may occur using another type of protocol.

Content delivery system 130 may store user profile information for users (e.g., users of user devices 146). The user profile information may include various information regarding a user, such as login information (e.g., a user identifier and a password), billing information, address information, types of services to which the user has subscribed, a list of video content purchased by the user, a list of video content rented by the user, a list of video content to which the user has subscribed, a list of users associated with the user account, ratings of video content by the user, a user device identifier (e.g., a media player identifier, a mobile device identifier, a set top box identifier, a personal computer identifier) for devices, such as STB 142, user device 146, etc., a video content application identifier associated with the video content application obtained from application server 160, or the like. Application server 160 may use the user profile information to authenticate a user (or associated users) and may update the user profile information based on the user's activity (e.g., with the user's express permission).

Content delivery system 130 may provide real-time network policies associated with each home network, signal flow policies, security policies, quality of service thresholds, gateway router bandwidth allocations, etc. In one implementation, content delivery system 130 may receive a request for a video streaming session to provide content to a user device 146 in home network 140. Content delivery system 130 may evaluate, for example, network conditions and bandwidth requirements associated with the request, and may determine whether the video streaming session can be supported. If the video streaming session cannot be supported, content delivery system 130 may deny the request. If the video streaming session can be supported, content delivery system 130 may reserve the required bandwidth for the request.

Content delivery system 130 may provide streaming data packets to user device 146, for instance using a router, streaming server, etc. (not shown). Content delivery system 130 may receive a request for streaming content from user device 146 and may continue to provide streaming content to user device 146 until particular requested content is received or user device 146 terminates a connection with content delivery system 130.

Content delivery system 130 may include a content cache, such as a computer device, and/or or a storage device, such as a database, that temporarily stores video content. For example, content delivery system 130 may store content, such as video program content, received from content storage system 120 and provide the stored content to user device 146.

Home network 140 may include one or more devices that transmit requests to application server 160 and/or content delivery system 130, and receive information from application server 160 and/or content delivery system 130. Home network 140 may include, for example, one or more STBs 142, televisions 144, one or more user devices 146, and/or personal computers. Home network 140 may also include other devices (not shown), such as additional media storage devices, a home router, a gateway (e.g., an optical network terminal (ONT)), etc.

Home network 140 may connect to content delivery system 130, application server 160, license server 170, access network 180, and/or other networks (e.g., public network 190). In one implementation, devices in home network 140 may connect to content delivery system 130 (e.g., via access network 180) to receive managed services (e.g., such a multimedia content provided with a guaranteed quality of service (QoS)) via a closed content distribution channel. The closed content distribution channel may be implemented through a subscription multimedia service providing network access through, for example the gateway, home router, or a local set-top box. Thus, access to content delivery system 130 may be restricted to particular users, particular devices, such as STBs 142, user devices 146, and/or applications running on the devices.

STB 142 may receive content from content delivery system 130 and output the content to TV 144 and/or user devices 146a-146n for display. STB 142 may include a component (e.g., a cable card or a software application) that plugs into a host device (e.g., TVs 144, and/or other devices, such as personal computers, mobile telephones, etc.) that allows the host device to display content. STB 142 may also be implemented as a home theater personal computer (HTPC), an optical disk player (e.g., digital video disk (DVD) or Blu-Ray™ disc player), a cable card, etc. STB 142 may receive commands from other devices in environment 100, such as a remote control (not shown) and user device 146. STB 142 may include one or more digital video recorders (DVRs) that allow STB 142 to record content and to playback the recorded content at a later time. In one embodiment, STB 142 may include a microphone and/or a camera.

TV 144 may include speakers as well as a display. TV 144 may play content, for example, received from STB 142. While some embodiments described below may use TV 144 to view content, other embodiments may use any device (e.g., a computer or a mobile phone) to display/provide content.

User device 146 may include any device capable of communicating via a network, such as home network 140 and/or access network 180, for controlling another device, such as STB 142, that may receive a video program. User device 146 may include an interactive client interface, such as a graphic user interface (GUI), and a transmitter capable of sending a remote signal to STB 142. User device 146 may include digital rights management (DRM) functionality to retrieve security information (e.g., decryption keys) and decrypt protected content received from content delivery system 130. Examples of user device 146 may include a mobile phone, a tablet, a personal computer, or another device that may receive video program related items, such as video program related applications and video program related content, and provide the video program related items at user device 146.

Video program related content may include content related to one or more video programs that may be provided by a service provider. For example, video program related content may include information related to particular video programs, such as listings of similar video programs, reviews of video programs, schedules for video programs, supplemental information regarding the particular video program, etc. Video program related applications may include applications that provide features that enhance the viewing experience for the user, such as a snapshot application that captures images and/or sections of the video program on user device 146, a remote control application that controls another device that receives and displays video programs, such as STB 142, etc.

Consistent with embodiments described herein, user device 146 may provide the video program related items using a video companion application. A user may input instructions for the video companion application via the interactive client interface of user device 146. The video companion application (e.g., executing on user device 146) may request, from application server 160 (e.g., via home network 140, access network 180, and public network 190) video program related items associated with a particular video program, (e.g., a program that is currently, or prospectively to be, received and displayed at TV 144 via STB 142). The video companion application may be a client-side application.

The video companion application may be displayed on the GUI of user device 146 and may provide a supplemental display/device with which a user may control and enhance the video program viewing experience. For example, user device 146 may execute the video companion application to provide video program related applications, such as selecting video programs from content delivery system 130 for STB 142 and controlling display of the video program at a display, for example TV 144, via STB 142. The video companion application (or instructions to retrieve the video companion application) may be included in, for example, portable media (e.g., a Blu-ray disc, a flash drive, etc.) that a user may supply to user device 146.

Content aggregator 150 may collect and/or present video program related content to user devices 146 and/or STB 142.

For example, content aggregator 150 may receive video content metadata, such as lists or categories of video content from content storage system 120 and/or content delivery system 130. Content aggregator 150 may also identify and aggregate information and applications related to video programs, such as social networks, reviews, message boards, general Internet searches, etc. Content aggregator 150 may use the video content metadata to provide currently-available video program related content options to user devices 146. Content aggregator 150 may also present video program related applications to user device 145. Content aggregator 150 may provide the video program related content to user device 146 directly or may communicate with user device 146 via application server 160.

Application server 160 may provide (e.g., to user device 146 via the video companion application) video program related items based on video program information associated with a video program received by STB 142. For example, a user may request a particular video program related item via a GUI on user device 146. Application server 160 may receive the request (from user device 146) and identify corresponding video program related items that fulfill the particular request. Application server 160 may fulfill the request by providing the video program related items to particular devices, such as a requesting user device 146, an indicated STB 142, or other indicated devices, based on user instructions included in the request.

According to one embodiment, application server 160 may include a capability to insert tags into a video stream for a video program based on instructions received from user device 146 (e.g., a personalized pop up feature which may be implemented by the user via application server 160 using user device 146). In another embodiment, application server 160 may include a video catalog application and/or perform user authentication, content listing management, or order processing based on input received from user device 146. In a further embodiment, application server 160 may permit user device 146 to download a video program related application that may permit a user to find content associated with a video program and to display or execute downloaded or streaming video content and/or applications.

Application server 160 may authenticate a user who desires to purchase, rent, or subscribe to video content. Application server 160 may also authenticate secondary users for shared applications and/or video programs. In one implementation, the interactions between application server 160 and user device 146 may be performed using the hypertext transfer protocol (HTTP) or the secure HTTP (HTTPS). In another implementation, the interactions between application server 160, STB 142 and user device 146 may be performed using another type of protocol.

License server 170 may include a server device, such as a computer device, that provides key and license management. License server 170 may communicate with user devices 146 directly or communicate with user devices 146 or STB 142 via application server 160. For example, license server 170 may receive a request from a user device 146 for a license relating to video content that user device 146 or STB 142 has downloaded. The license may include information regarding the type of use permitted by user device 146 or STB 142 (e.g., a complementary application or content, a purchase, a rental, limited shared usage, or a subscription) and a decryption key that permits user device 146 to decrypt the video content or application. In one implementation, the communications between license server 170 and user device 146 may be conducted over a secure channel, may include public and private keys, or may include other forms of secure communication.

In implementations herein, license server 170 may communicate with devices in home network 140, such as user device 146 and STB 142, to authenticate a user of the device(s), user device 146, STB 142, and/or an application(s) residing on user device 146 or STB 142. For example, license server 170 may request/receive login information associated with the user, and compare the login information with stored information to authenticate the user. Additionally, or alternatively, license server 170 may request/receive device information (e.g., a unique device identifier) associated with user device 146, and compare the device information with stored information to authenticate the user device. Also, or alternatively, license server 170 may request/receive application information associated with a video companion application (e.g., a client application residing on user device 146 to enable interaction with other devices, Facebook, Twitter, etc.), and compare the application information with stored information to authenticate the application.

Access network 180 may provide customers with multimedia content provided, for example, by content delivery system 130. Access network 180 may include a local area network (LAN), a wide area network (WAN), such as a cellular network, a satellite network, a fiber optic network, a private WAN, or a combination of the Internet and a private WAN, etc. that is used to transport data. Although shown as a single element in FIG. 1, access network 180 may include a number of separate networks that function to provide services to home network 140. In one implementation, access network 180 may terminate at home network 140 via an optical communication link, such as an optical fiber provided to home network 140. In another possible implementation, access network 180 may terminate at home network 140 via a coaxial cable. In still another implementation, access network 180 may terminate at home network 140 via a wireless (e.g., satellite) connection.

Public network 190 may include a WAN, an intranet, a telephone network (e.g., the Public Switched Telephone Network), or a combination of networks. Public network 190 may include, for example, an untrusted network, such as the Internet. Public network 190 may further include transport and/or network devices such as routers, switches, and/or firewalls While FIG. 1 shows a particular number and arrangement of networks and/or devices, in practice, environment 100 may include additional networks/devices, fewer networks/devices, different networks/devices, or differently arranged networks/devices than are shown in FIG. 1. For example, content delivery system 130 may be implemented as multiple, possibly distributed, devices.

FIG. 2 is a diagram of example components of a device 200. Device 200 may correspond to content provider 110, content processing system 120, content delivery system 130, devices in home network 140 such as STB 142, user devices 146a-146n, content aggregator 150, application server 160, or license server 170. Each of content provider 110, content processing system 120, content delivery system 130, devices in home network 140, such as STB 142, user devices 146a-146n, content aggregator 150, application server 160, and license server 170 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of environment 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

FIG. 3A is a diagram showing an example of one embodiment of a video companion system 300 from a user perspective. Video companion system 300 may include a video program 312, which may be displayed at TV 144, and a video companion application 322, which may be displayed/executed at user device 146.

A user (not shown) may start video companion application 322 on companion display 320 of user device 146. For example, the user may "turn on" video companion application 322 by clicking on an icon (not shown) associated with video companion application 322 in the interactive client interface of user device 146. Video companion application 322 may be placed in a state in which the user may input instructions for video companion application, for instance, using an interactive client interface of user device 146. Video companion application 322 may allow a user to implement video program related items for user device 146 and/or STB 142.

Video companion application 322 (via user device 146) may initiate a connection with application server 160 (e.g., via access network 180 and public network 190) and initiate a registration process. In one embodiment, the registration process may be conducted as a sequence of HTTP and/or HTTPS requests and responses. The registration process may include, for example, a login sequence that includes submission, by user device 146 to application server 160, of a user name and/or password (e.g., which may be input by a user of user device 146 via, for example, a television/remote control interface). Application server 160 may retrieve user profile information, associated with the user, from a profile server (not shown) associated with the service provider. Application server 160 may, for example, compare the password received by user device 146 with a password stored in the user profile to authenticate the user (e.g., of user device 146). Application server 160 may also identify a level of subscription services and/or access rights associated with the user profile. Additionally, or alternatively, application server 160 may provide updates to a user profile based on inputs received from user device 146.

Video companion application 322 may receive video program related content, such as lists or categories of video programs. Video companion application 322 may receive the video program related content based on user input, to the user via companion display 320 of user device 146. Alternatively, video companion application 322 may receive the video program related content in response to automated requests provided by video companion application 322, such as a request for a listing of popular video programs. Video companion application 322 may receive the video program related content from application server 160. Alternatively, video companion application 322 may receive the video program related content from a secondary source such as content aggregator 150, based on instructions provided by application server 160 to content aggregator 150.

FIG. 3B is a diagram of an exemplary program guide interface 350 for presenting via video companion application 322. According to one embodiment, as described with respect to FIG. 3B and diagram 350, video companion application 322 may allow the user to select video programs 312 from video program guide 350, based on video program related content, by inputting instructions to the interactive client interface of user device 146. Video program guide 350 includes multiple options 360 including DVR 362, VOD 364, and TV listings 366, which may each contain a number of video programs, such as video program 312 described herein, that may be accessed by video companion application 322 and displayed on TV 144 via STB 142. For example, video programs include "Some Judge", "Wolf News", etc. Additionally, video program guide 350 includes a recommend option 368 by which a user may send a recommendation of a video program 312 to another party. Video program guide 350 also includes a portals option 370, selection of which may cause user device 146 to display websites, and provide access to other aggregations of content, e.g., for a particular content provider 110. Video program guide 350 may also include a settings option 372 for enabling modification of settings for user device 146, STB 142, and TV 144.

Video companion application 322 may enable selection of a particular video program 312 provided by a service provider (e.g., a particular channel or video on demand (VOD) program) from video program guide 350. Video program 312 may include particular subject matter (e.g., genres, sports, documentaries, etc.) and other identifying aspects including, for example, a title, actors, directors, etc. For example, as shown in FIG. 3B, the user may select TV listings 366 that include a program guide for TV channels 352. The user may select a particular TV channel 352, for example LMN TV at an appropriate time slot 354 to view a particular video program 312, in this instance "Green Hills" at 5:30 PM.

Video companion application 322 may allow the user to search or browse TV programs or video on demand (VOD) listings 364, using a video program search application and video program related content (i.e., a video program related application), which may be enabled via application server 160. In one implementation, application server 160 may receive video program related content from content aggregator 150 and format the video program related content into a format appropriate for user device 146. Application server 160 may send video program related content to user device 146. In another implementation, video program related content may include a link to another device (e.g., a URL that links to the other device) where user device 146 may access video program related content.

Video companion application 322 may initiate a viewing session in a display 310 of TV 144, via STB 142 for video program 312. For example, video companion application 322 may turn STB 142 on and turn TV 144 on. In this instance, video companion application 322 may implement a remote control application that controls STB 142 and/or TV 144 (e.g., through a local wireless network in home network 140). Video companion application 322 may tune STB 142 to video program 312, which may output video program 312 to display 310 of TV 144. Video companion application 322 may enable the user to adjust settings 370 of STB 142, TV 144, or user device 146. For example, the user may adjust brightness of TV 144.

STB 142 may receive video program 312 from a service provider via access network 180. Video program 312 may be provided to the user via a content delivery system 130 as described hereinabove with respect to FIG. 1. According to one embodiment, video companion application may request (e.g., via home network 140) the selected content from a remote server (e.g., in content delivery system 130) via a closed content distribution channel. The user may register and subscribe (or have previously registered and subscribed) to particular programs provided by the service provider. Home network 140 associated with the user, user device 146, and/or STB 142 may have been authenticated and authorized in association with the user (or users).

According to one embodiment, STB 142 may currently be receiving a video program 312. Video companion application 322 may determine the particular video program 312, for example, by sending a request and receiving a signal/information from STB 142, content delivery system 130, or application server 160, providing information regarding the video program, based, for instance, on an existing protocol and capabilities of the devices within home network 140.

Video companion application 322 may provide one or more video program related items (or options to access video program related items) to the user based on a particular video program 312. The video program related items including video program related applications and video program related content. The user may select (e.g., via an interactive client interface) particular video program related items to view. The indication of the particular video program related items may be sent from user device 146 to application server 160. Application server 160 may receive selection of video program related items and may provide (e.g., using an HTTP/HTTPS connection via access network 180 and public network 190) to user device 146, STB 142 a link (e.g., a URL) to content delivery system 130, content aggregator 150, and/or a link to license server 170. The link to license server 170 may include, for example, an IP address to access license server 170.

According to one embodiment, video companion application 322 may allow user to access additional information related to video program 312 using user device 146. For example, video companion application 322 may receive additional information regarding video program 312 provided by content aggregator 150 in response to a user request. For example, video companion application 322 may search the Internet for video program related content. Video companion application 322 may also receive reviews, user feedback, or other video program related information from identified portals 370, such as social networks (e.g., Facebook, Twitter, etc.), video program related websites (e.g., Internet Movie Database (IMDB), content provider websites, etc.) and general websites.

According to one embodiment, if the user identifies a video program 312 based on video program related information from identified portals 370, such as related movies or video programs (e.g., to a first video program 312), video companion application 322 may perform a search of a particular database of video programs 312 (e.g., a service provider associated database, such as a VOD 364 and/or TV listings 366 database) related to the identified video program 312. Alternatively, video companion application 322 may automatically retrieve information from the particular database of video programs 312 based on the user input to user device 146.

According to another embodiment, video companion application 322 may provide an option for the user to select a video program 312 and to tune or initiate playback of the selected video program 312 on STB 142 (and corresponding TV 144) to view. If the selected video program 312 is not currently available (for e.g. TV program airing at a later time, a movie from VOD, etc.) video companion application 322 may provide options for the user to record the selected video program 312 at a later time using a DVR 362, to set up a reminder for show time, or to bookmark the selected video program 312 for a later viewing session.

According to another embodiment, video companion application 322 may provide recommend option 368 to allow the user to recommend a selected video program 312 to an identified party (i.e., a "Tell a friend" option). Video companion application 322 may provide a recommendation message for the identified party using a selected messaging format, such as short message service (SMS), email, social networks, etc. Additionally, video companion application 322 may provide an option for the user to purchase the video program 312 from the service provider and send a link to the purchased video program 312 (i.e., "an online gift") to the identified party using the selected messaging format. The user and the identified party may view the selected video program 312 simultaneously, as described with respect to FIG. 4, and diagram 400 hereinbelow.

Figure 4:
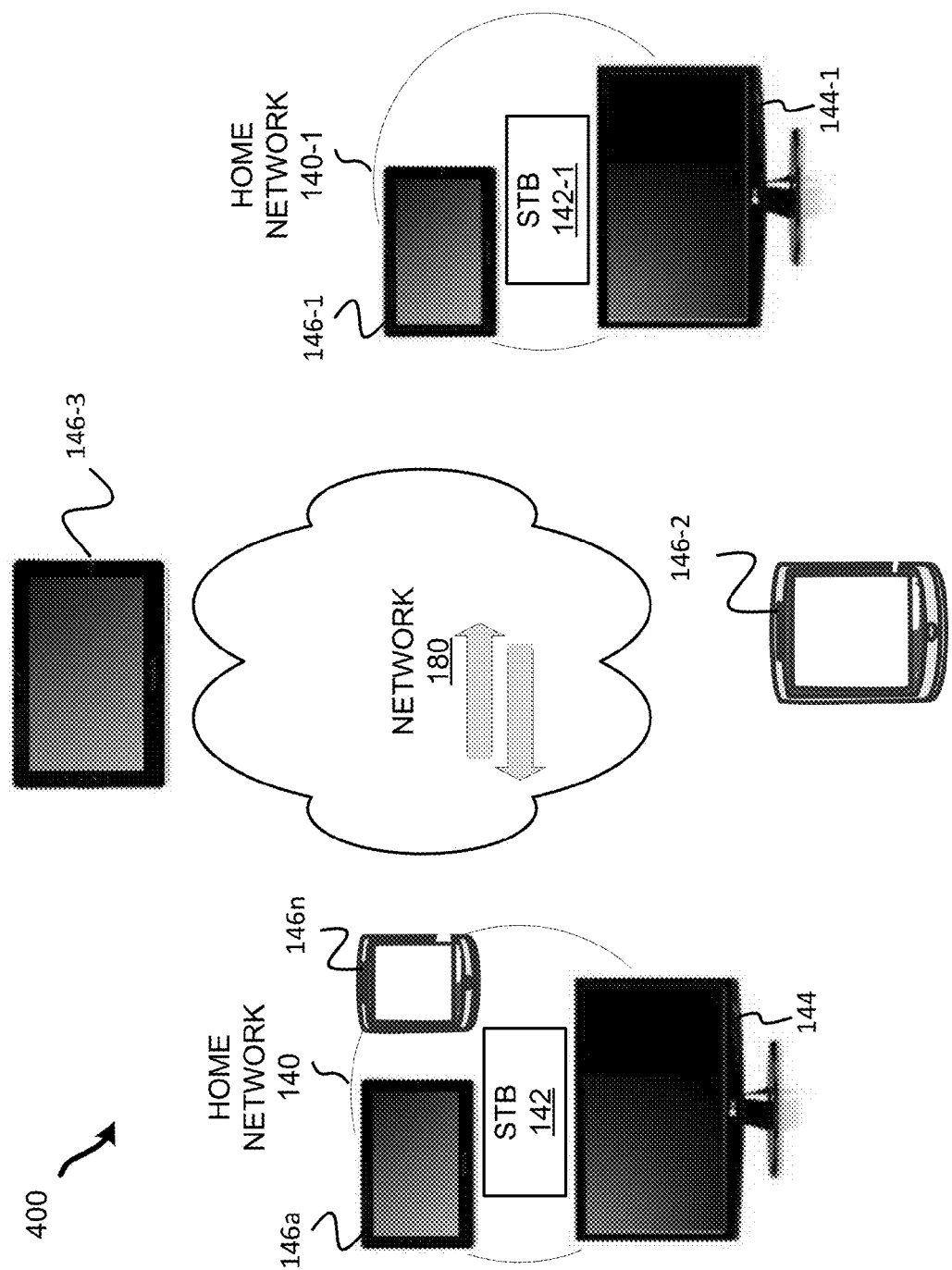
FIG. 4 is a diagram of an overview of participants in an exemplary joint video session.

FIG. 4 is a diagram showing an example of one embodiment of a joint video session 400 for a video program 312. Joint video session 400 may be provided to multiple devices corresponding to different users, such as a first user at home network 140, a second user at home network 140-1, a third user at user device 146-2, a fourth user at user device 146-3, etc.

Video companion application 322 may implement a joint video session 400 that enables different users to share viewing of video program 312 in a virtual environment. The different users may be located in different locations (e.g., locations that are geographically dispersed) that may receive video program 312 via access network 180 from content delivery system 130.

According to one embodiment, video companion application 322 may receive input from a user of user device 146-1 that initiates a joint video session 400. The input may include a listing of invited users for joint video session 400. For example, the listing may include an identifier for each invited user based on a contact messaging format, such as a telephone number for SMS, an email address for email, an identifier for a video companion application for the invited user, a social network address, etc. Video companion application 322 may store information regarding joint video session 400 on user device 146 and may also send the information regarding joint video session 400 to application server 160, which may support the requested rules, operations, etc., for joint video session 400 provided by video companion application 322. For example, video companion application 322 may store identifiers for invited users and corresponding privileges for joint video session 400 for each invited user, such as session control, etc.

Video companion application 322 may send a joint session message for joint video session 400 via application server 160 to the list of invited users. Application server 160 may format the joint session message based on a receiving device for the joint session message. Application server 160 may format the joint session message that video companion applications for receiving devices may receive and determine required information for participation in joint video session 400. For example, application server 160 may format the joint session message as follows: "Service Provider Identifier: Joint Session ID". Application server 160 may send the joint session message over a predetermined channel, such as a SMS channel.

When an invited user receives the joint session message, a video companion application 322-1 of a user device 146-1 may process the joint session message and proposes to the handset owner for proper action through its graphical user interface. If the invited user chooses to join joint video session 400, video companion application 322-1 may send a request to application server 160 to provide video program 312. The request may include a device type for a target device that may receive the video program 312, e.g., user device 146-1. Application server 160 may provide a streaming URL based on a device type for user device 146-1 or alternatively a device type for STB 142-1. The user may select a device to view the video program 312, for example if the user is at home, the user may select STB 142-1 and corresponding TV 144-1.

Different target devices, e.g. TVs 144 (e.g., a TV 144 that includes an integrated cable card), smart phones, iPads, Android tablets, etc., may require streams of different formats, quality etc. Application server 160 may provide the appropriate streaming URL to the requesting devices based on the different target device types. User device 146-1 may use the received streaming URL to access the video program 312 from a streaming server in content delivery system 130. The streaming server may synchronize different streams to different types of devices for the joint video session 400.

According to one embodiment, the user that initiates joint video session 400 may retain session control privileges for joint video session 400. The invited users may receive member privileges of joint video session 400, such as viewing privileges for the video program 312. Alternatively, the initiating user may provide session controlling privileges to designated identified users. If the video program 312 is a VOD video program, the initiating user may pay for joint video session 400 along with other associated cost.

According to one embodiment, all the users within a joint video session 400 may be able to communicate and share comments through video companion application 322 while the users are watching the video program 312 from different devices at different location at a same time. The users may also share comments on social networks. The users may also be able to participate in a video chat session, for example, with each other through a communication tool that may be associated with video companion application 322.

Although FIG. 4 shows example components of network portion 400, in other implementations, network portion 400 may include fewer components, different components, differently arranged components, and/or additional components than depicted in FIG. 4. Alternatively, or additionally, one or more components of network portion 400 may perform one or more other tasks described as being performed by one or more other components of network portion 400.

Figure 5:
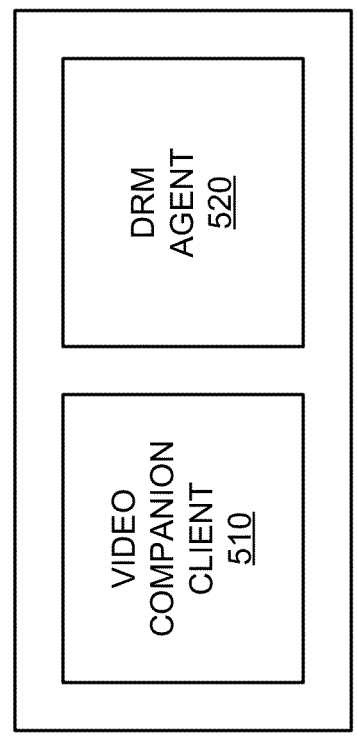
FIG. 5 is a diagram of example functional components of the user device of FIG. 1.

FIG. 5 is a diagram of example functional components of user device 146. In one implementation, the functions described in connection with FIG. 5 may be performed by one or more components of device 200 (FIG. 2). As shown in FIG. 5, user device 146 may include a video companion application client 510 and a DRM agent 520.

Video companion application client 510 may include hardware or a combination of hardware and software that may enable user device 146 to interface with application server 160 and content delivery system 130 and to present content selection options to a user. In one implementation, video companion application client 510 may be stored temporarily (e.g., in memory 230) on user device 146. In one implementation, video companion application client 510 may request, from application server 160, a list of content available for downloading and may present the list of content to a user. Video companion application client 510 may include an interactive client interface that allows a user provide inputs such as user passwords, preferences, and selections from the list of available content.

DRM agent 520 may include hardware or a combination of hardware and software that may retrieve security information (e.g., decryption keys) from license server 170 (or another device) to access protected content received from content delivery system 130. For example, DRM agent 520 may communicate with video companion application client 510 to identify selected content and coordinate the receipt of DRM security information (e.g., from license server 170) with the protected content from content delivery system 130. Protected content may include, for example, any content encrypted to enforce copyright restrictions.

Although FIG. 5 shows example functional components of user device 146, in other implementations, user device 146 may include fewer functional components, different functional components, differently arranged functional components, and/or additional functional components than depicted in FIG. 5. Alternatively, or additionally, one or more functional components of user device 146 may perform one or more other tasks described as being performed by one or more other functional components of user device 146.

FIG. 6A is a flowchart of an exemplary process 600 for implementing a video companion application. Process 600 may execute in user device 146. It should be apparent that the process discussed below with respect to FIG. 6A represents a generalized illustration and that other elements may be added or existing elements may be removed, modified or rearranged without departing from the scope of process 600.

At block 602, video companion application 322 may be activated on user device 146, for example, by a user of user device 146. User device 146 may be placed in an active state with regard to video companion application 322. For example, the user may click on an icon associated with video companion application 322. Alternatively, video companion application 322 may be automatically activated when user device 146 is powered on.

At block 604, video companion application 322 may request video program related content from application server 160. Video program related content may include information related to a particular video program, such as metadata for one or more video programs, listings of similar video programs, reviews of video programs, schedules for video programs, supplemental information regarding particular video programs, previews and/or excerpts of the video programs, etc. Video companion application 322 may receive the video program related content and display the video program related content on user device 146 (block 606).

At block 608, video companion application 322 may receive commands input by a user for video program related items (block 608). For example, the user may input commands to user device 146 using an interactive client interface of user device 146. A received command may include a command to select a video program 312 based on the video program related content.

Video companion application 322 may cause selection of a video program 312 on STB 142 (block 610). For example, video companion application 322 may tune to a particular TV channel on STB 142. STB 142 may output the TV channel to TV 144.

At block 612, video companion application 322 may request additional video program related items, based on video program 312, from application server 160. For example, video companion application 322 may request video program related items based on the particular video program 312, such as behind the scenes footage for the video program 312, websites that feature the video program 312, etc.

Video companion application 322 may receive the additional video program related items from application server 160 (block 614) and display the additional video program related items on user device 146.

Video companion application 322 may recommend 368 a video program to an identified party (block 616). For example, video companion application 322 may send a recommendation message to the identified party via application server 160.

FIG. 6B is a flowchart of an exemplary process 600 for implementing a video companion application. Process 650 may execute in application server 160. It should be apparent that the process discussed below with respect to FIG. 6B represents a generalized illustration and that other elements may be added or existing elements may be removed, modified or rearranged without departing from the scope of process 650.

At block 652, application server 160 may receive a request for video program related item from user device 146. The requested video program related item may include video content related applications, such as a joint video session application, etc., or video program related content, such as listings of video programs, reviews, previews, synopses, etc. The request for video program related content may include an identifier for the video program related content, such as a title, a website, a genre, a search term, or a unique identifier associated with the program.

At block 654, application server 160 may provide the video program related content to user device 146. For example, application server 160 may provide a command for content aggregator 150 to provide the requested video program related content to user device 146. Content aggregator 150 may provide the video program related content to user device 146 via access network 180. Alternatively, content aggregator 150 may provide the video program related content to application server 160, which may reformat the video program related content based on a type of user device 146, and send the requested video program related content to user device 146.

At block 656, application server 160 may receive request for additional video program related items based on a particular video program 312. For example, the user may input a request for additional video program related items in video companion application using an interactive client interface of user device 146.

At block 658, application server 160 may determine additional video program related items based on a particular video program 312. For example, application server 160 may compare identifying aspects of video program 312, such as particular subject matter, actors, directors, etc., with a database of video programs to identify similar video programs based on a user request. Application server 160 may provide the additional video program related items (block 660).

Figure 7A:
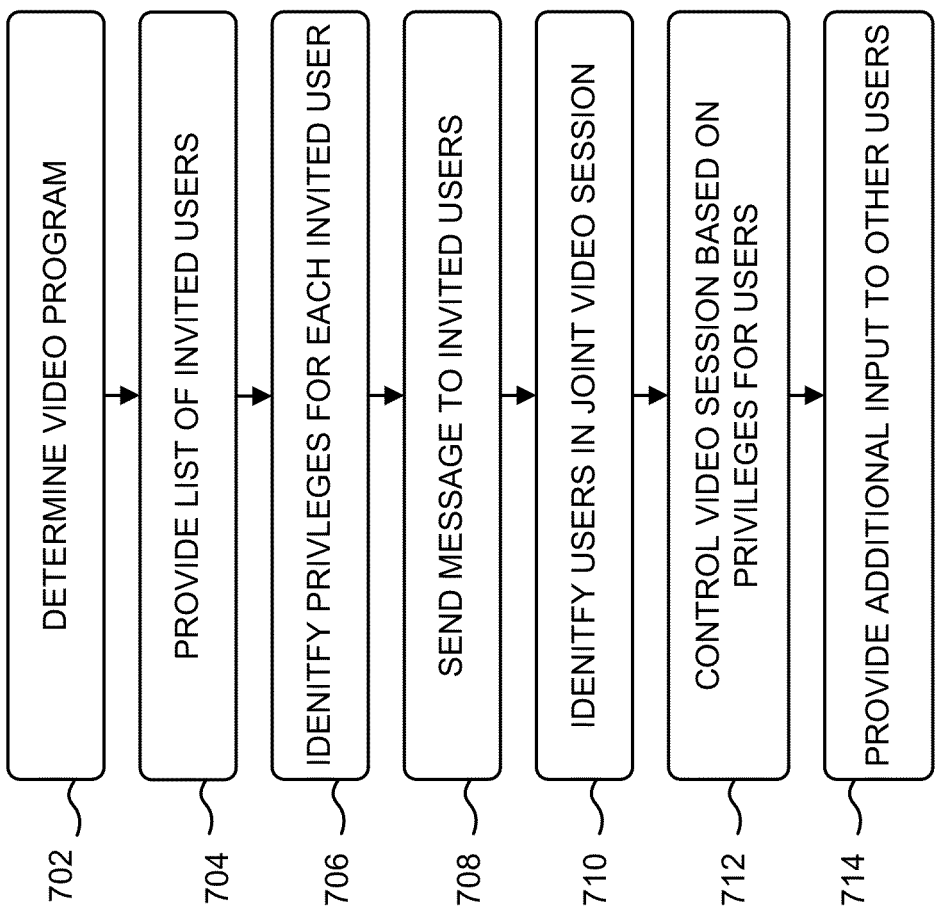
FIG. 7A is a flowchart of an exemplary process for implementing a joint video session.

FIG. 7A is a flowchart of an exemplary process 700 for implementing a joint video session. Process 700 may execute in user device 146. It should be apparent that the process discussed below with respect to FIG. 7A represents a generalized illustration and that other elements may be added or existing elements may be removed, modified or rearranged without departing from the scope of process 700.

At block 702, video companion application 322 may determine a video program 312 that is to be the subject of a joint video session 400. For example, a user may enter input via the interactive client interface of user device 146 to identify video program 312.

Video companion application 322 may provide a list of invited users (block 704). For example, video companion application 322 may provide identifiers associated with corresponding video companion applications 322 of the invited users. Alternatively, video companion application 322 may provide an email address, a telephone number, etc., to application server 160 based on a preferred mode of contact for each invited user.

Video companion application 322 may provide privileges for each invited user (block 706). For example, the initiating user for joint video session 400 may allow the invited users to view joint video session 400. Further, the initiating user may provide different control privileges for joint video session 400 for the invited users.

Video companion application 322 may send an invitation to join the joint video session 400 to the invited users (block 708). For example, video companion application 322 may send the invitation to application server 160. Application server 160 may forward the invitation to the invited user and may include a channel at which video program 312 may be received.

Video companion application 322 may receive an indication of invited users that have accepted the invitation and are participating in joint video session 400 (block 710). Video companion application 322 may receive the indication via application server 160 and access network 180.

Video companion application 322 may control joint video session 400 (block 712). For example, video companion application 322 may start the video program 312, pause the video program, etc. The video program 312 may be output in a synchronized manner to the invited users. Alternatively, invited users may have privileges to view the video program 312 in a partially nonsynchronous (e.g., a maximum time deviation of ten minutes between the invited user and the initiating user) or fully nonsynchronous manner.

At block 714, video companion application 322 may provide additional input to other users, such as the invited users. For example, video companion application 322 may receive comments and/or metadata that may be provided in association with joint video session 400 for video program 312. The comments and/or metadata may be provided to video companion applications 322 and displayed at user devices 146 or may be inserted into the video program 312, such as a commentary sidebar or a video conferencing application that is integrated into the video companion application 322.

Figure 7B:
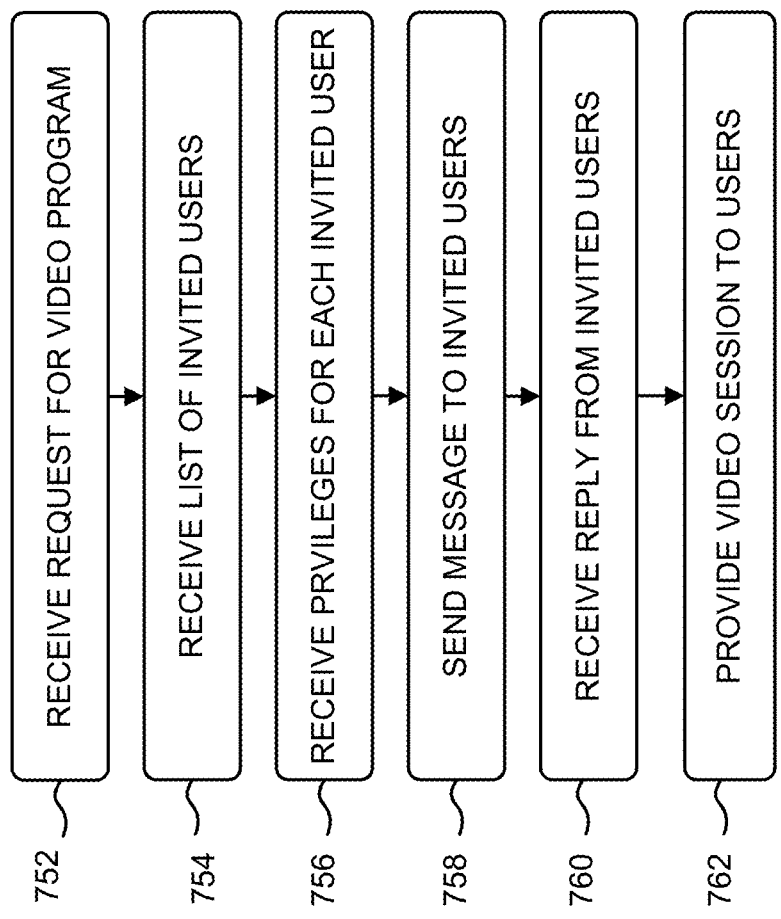
FIG. 7B is a flowchart of another exemplary process for implementing a joint video session.

FIG. 7B is a flowchart of an exemplary process 600 for implementing a video companion application. Process 750 may execute in application server 160. It should be apparent that the process discussed below with respect to FIG. 7B represents a generalized illustration and that other elements may be added or existing elements may be removed, modified or rearranged without departing from the scope of process 750.

At block 752, application server 160 may receive a selected video program 312 for a joint video session 400 from user device 146. Application server 160 may receive a list of invited users from user device 146 (block 754). Application server 160 may receive privileges for each invited user from user device 146 (block 756).

At block 758, application server 160 may send an invitation to the invited users. Application server 160 may send the invitation message in formats for each of the invited users based on indicated preferences, different device types, etc.

At block 760, application server 160 may receive replies form the invited users. The replies may indicate that the invited users accept the invitation and request information to receive joint video session 400.

At block 762, application server 160 may provide joint video session 400 to the users (initiating user and invited users). Application server 160 may provide joint video session with control privileges for each invited user. Alternatively, initiating user may be a session controller for joint video session 400, e.g., using a video companion application 322.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, while series of blocks have been described with respect to FIGS. 6A-7B, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Although the implementations described above mainly refer to a video companion application that provides video program related items on a user device that is separate from a set top box that provides a video program, in other implementations, the video companion application may be implemented on a set top box or other device, for e.g., using a picture in picture application.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
   identifying, by a user device that includes a graphical user interface, a particular video program currently being received by a set top box, wherein the set top box is different from the user device and the user device is at a first home network;
   requesting, by the user device, video program related content regarding the particular video program, wherein the video program related content includes a listing of at least one similar video program to the particular video program and supplemental content for the particular video program, wherein the supplemental content is not an electronic program guide;
   receiving the video program related content;
   presenting the video program related content in the graphical user interface of the user device;
   receiving, at the user device, a selection of one of the at least one similar video program to be played at the set top box;
   signaling, by the user device, the set top box to play the selected at least one similar video program;
   controlling, by the user device, a viewing session at a display associated with the set top box for the at least one similar video program while displaying the video program related content at the graphical user interface of the user device;
   identifying at least one party to receive a recommendation based on the particular video program, wherein the party is associated with a second device at a second home network which is different from the first home network; and
   sending the recommendation based on the video pro ram to the identified at least one party via the second device.

2. The computer-implemented method of claim 1, further comprising:
   requesting additional video program related information regarding the particular video program, wherein the additional video program related information includes information collected from one or more of social networks, reviews, message boards, or a general Internet search.

3. The computer-implemented method of claim 2, wherein the additional video program related information includes a reference to at least one other video program, further comprising:
   selecting a new video program based on the additional video program related information;
   identifying the selected new video program in a database of video programs, wherein the database of video programs includes one or more of a television listings database or a video on demand database; and
providing the selected new video program from the database of video programs.

4. The computer-implemented method of claim 1, wherein the video program related content includes one or more of social media content related to the particular video program, or supplemental information regarding the particular video program.

5. The computer-implemented method of claim 1, wherein the user device comprises one of a mobile telephone, a tablet computer device, or a personal computer.

6. The computer-implemented method of claim 1, wherein controlling, by the user device, the viewing session further comprises:
determining a list of invited users at multiple devices for a joint video session for the video program, wherein the user device is at a first home network and at least one of the multiple devices is at a second home network different from the first home network;
sending an invitation to the joint video session to the invited users;
receiving an indication of invited users that accept the invitation to the joint video session; and
controlling the joint video session for the video program for the invited users.

7. The computer-implemented method of claim 6, wherein the invited users receive the joint video session for the video program in a format based on one or more of a selected preference and a receiving device type, further comprising:
communicating with the invited users via a communication tool associated with the user device while viewing the joint video session at the display associated with the set top box; and
inserting tags into the video program.

8. The computer-implemented method of claim 1, further comprising:
inserting tags into a video stream for the particular video program based on instructions received from the user device.

9. A computer-implemented method, comprising:
receiving, from a user device, at an application server, a request for video program related content regarding a particular video program currently being displayed at a display associated with a set top box, wherein the video program related content includes content that is not an electronic program guide and is supplemental to the particular video program and the user device is at a first home network;
providing, by the application server, the requested video program related content to the user device;
receiving a request for a video program, based on the video program related content, to be provided to at least one device indicated by the user device; and
providing the video program to the at least one device indicated by the user device, wherein a viewing session at the at least one device is controllable by the user device;
identifying at least one party to receive a recommendation based on the particular video program, wherein the party is associated with a second device at a second home network which is different from the first home network; and
sending the recommendation based on the video program to the identified at least one party via the second device.

10. The computer-implemented method of claim 9, further comprising:
receiving a request for additional video program related items based on the particular video program;
determining the additional video program related items based on the particular video program, wherein the additional video program related items include a snapshot application that captures images or sections of the particular video program on the user device; and
sending the additional video program related items to the user device.

11. The computer-implemented method of claim 9, further comprising:
receiving a list of invited users at multiple devices to a joint session for the particular video program, wherein the user device is at a first home network and at least one of the multiple devices is at a second home network different from the first home network;
sending a message to the invited users, wherein the message includes a link for the particular video program;
receiving a reply from at least one of the invited users; and
providing the particular video program to the at least one of the invited users.

12. The computer-implemented method of claim 9, wherein the video program related content includes one or more of social media content related to the particular video program, or supplemental information regarding the particular video program.

13. A user device, at a first home network, comprising:
a memory to store a plurality of instructions; and
a processor configured to execute instructions in the memory to:
identify a particular video program currently being received by a set top box that is different from the user device;
request video program related content regarding the particular video program, wherein the video program related content includes content that is not an electronic program guide and is supplemental to the particular video program;
receive the video program related content;
present the video program related content in a graphical user interface of the device;
receive a selection of a video program to be played at the set top box based on the video program related content;
select the video program to be played at the set top box in response to receipt of the selection;
control a viewing session for the video program at a receiving device using the user device, wherein the receiving device is different from the user device;
identify at least one party to receive a recommendation based on the particular video program, wherein the party is associated with a second device at a second home network which is different from the first home network; and
transmit the recommendation based on the video program to the identified at least one party via the second device.

14. The user device of claim 13, where the processor is further to:
request additional video program related information based on the particular video program, wherein the additional video program related information includes information collected from one or more of social networks, reviews, message boards, or a general Internet search.

15. The user device of claim 14, where the processor is further to:

receive a selection of a new video program based on the additional video program related information;

identify the selected new video program in a database of video programs, wherein the database of video programs includes one or more of a television listings database or a video on demand database; and provide the selected new video program from the database of video programs.

16. The user device of claim 13, wherein, when controlling the viewing session for the video program using the user device, the processor is further configured to:

determine a list of invited users for a joint video session for the video program;

send an invitation to the joint video session to the invited users;

receive an indication of invited users that accept the invitation to the joint video session; and control the joint video session for the video program for the invited users.

17. The user device of claim 16, wherein the invited users receive the joint video session for the video program in a format based on one or more of a selected preference and a receiving device type.

18. A non-transitory computer-readable medium including instructions to be executed by a processor, the instructions including one or more instructions, when executed by the processor, for causing the processor to:

identify a particular video program currently being received by a set top box that is different from a user device including the processor, wherein the user device is at a first home network;

receive a selection for video program related content regarding the particular video program, wherein the video program related content includes content that is not an electronic program guide and is supplemental to the particular video program;

send a request to an application server device for the video program related content;

receive the video program related content;

present the video program related content in a graphical user interface of the user device;

control a viewing session for the particular video program using the user device while displaying the video program related content at the graphical user interface of the user device;

identify at least one party to receive a recommendation based on the particular video program, wherein the party is associated with a second device at a second home network which is different from the first home network; and transmit the recommendation based on the video program to the identified at least one party via the second device.

19. The non-transitory computer-readable medium of claim 18, wherein, when controlling the viewing session for the particular video program using the user device, the one or more instructions further includes instructions to:

determine a list of invited users for a joint video session for the particular video program;

send an invitation to the joint video session to the invited users;

receive an indication of invited users that accept the invitation to the joint video session; and control the joint video session for the particular video program for the invited users.

20. The non-transitory computer-readable medium of claim 18, wherein the one or more instructions further includes instructions to:

request additional video program related information based on the particular video program, wherein the additional video program related information includes information collected from one or more of social networks, reviews, message boards, or a general Internet search.

* * * * *